United States Patent [19]
Tsuji et al.

[11] Patent Number: 5,239,378
[45] Date of Patent: Aug. 24, 1993

[54] GRADATION CORRECTOR WITH IMPROVED SMOOTHING, SIGNAL-TO-NOISE RATIO AND FAST RESPONSE TIME

[75] Inventors: Toshiaki Tsuji; Atsuhisa Kageyama, both of Ibaraki, Japan

[73] Assignee: Matsushita Electric Industrial Co., Ltd., Osaka, Japan

[21] Appl. No.: 838,844

[22] Filed: Feb. 21, 1992

[30] Foreign Application Priority Data

Feb. 27, 1991 [JP] Japan ................... 3-032792

[51] Int. Cl.⁵ ............................................. H04N 5/208
[52] U.S. Cl. ....................................... 358/166; 382/18
[58] Field of Search ................. 358/167, 166, 105, 37, 358/36; 382/18

[56] References Cited

U.S. PATENT DOCUMENTS

| | | | |
|---|---|---|---|
| 4,855,825 | 8/1989 | Santamaki et al. | 358/136 X |
| 5,025,316 | 6/1991 | Darby | 358/105 |
| 5,032,905 | 7/1991 | Koga | 358/136 X |

FOREIGN PATENT DOCUMENTS 3126377 5/1991 Japan .

*Primary Examiner*—Victor R. Kostak
*Attorney, Agent, or Firm*—Stevens, Davis, Miller & Mosher

[57] ABSTRACT

In a gradation corrector used in a television receiver, a clipping circuit is connected to an output of a histogram memory and a clipping level of the clipping circuit is changed in accordance with an output of an S/N detecting circuit. Thereby, when the minimum value is detected, it is possible to prevent a large variation of the value to be detected which may be caused from noises or the like. Also, a circuit for detecting a change in video scene and a recursive filter circuit composed of an adder and a xK circuit (and a two-input/one-output selector circuit are provided on the output side of a clipping circuit and the coefficient value K of the xK circuit (or the selector circuit is controlled in accordance with an output of the video scene change detecting circuit. Thereby, it is possible to make a smooth gradation correction which is not affected by noises or the like (or to make a gradation correction with rapid response which follows a change in video scene.

3 Claims, 4 Drawing Sheets

GRADATION CORRECTOR WITH IMPROVED SMOOTHING, SIGNAL-TO-NOISE RATIO AND FAST RESPONSE TIME

BACKGROUND OF THE INVENTION

The present invention relates to a gradation corrector used in correcting the gradation of a video signal in a television receiver, a video tape recorder, a video camera, a video disk or the like.

In recent years, great importance has been attached to a gradation corrector in order to provide a more clear image which is required with the increase in size of a color television receiver and the improvement in image quality thereof, and more especially, in order to expand the dynamic range of an image on a CRT by passing a video signal through a non-linear amplifier to correct the gradation of the video signal.

FIG. 4 shows a block diagram of a gradation corrector proposed precedently to the present application. In FIG. 4, reference numeral 1 designates an A/D converter for converting an input luminance signal into a digital value. Numeral 2 designates a histogram memory for obtaining a luminance distribution of the input luminance signal. In general, the luminance level enters an address of the memory 2 and the frequency enters as data thereof. Numeral 3 designates a histogram operating circuit for computing histogram features such as mean value, mode value, minimum value, maximum value, deviation coefficient, white area, black area, etc. of the input luminance signal from the data of the histogram memory 2 and computing control values inclusive of a limiter level, the value of addition, an accumulation start luminance level, an accumulation stop luminance level, the maximum luminance level and so on from the determined values to output the control values to a limiter/adder circuit 5, an accumulation control register circuit 6 and a normalization control register circuit 7. The limiter/adder circuit 5 is provided for processing the data of the histogram. Namely, on the basis of data transferred from the histogram operating circuit 3, the limiter/adder circuit 5 imposes a limitation on the data of the histogram so that it does not exceed a certain level and performs the operation of addition. In general, the data processing performed by the limiter/adder circuit 5 is completed during a time when the address is accessed once. The accumulation start and stop luminance levels, at which the accumulation is to be started and stopped in determining a cumulative histogram, are supplied from the histogram operating circuit 3 to the accumulation control register circuit 6 which in turn controls a histogram accumulation circuit 8.

The histogram accumulation circuit 8 makes the accumulation of processed data from the histogram memory 2 on the basis of a control signal from the accumulation control register circuit 6. Numeral 9 designates a cumulative histogram memory for storing therein the result of accumulation by the histogram accumulation circuit 8. In general, the luminance level enters an address of the memory 9 and the frequency enters as data thereof. In normalizing data of the cumulative histogram to produce a look-up table, the maximum luminance level for an output luminance signal after normalization is supplied from the histogram operating circuit 3 to the normalization control register circuit 7 and the normalization control register circuit 7 controls a normalization coefficient in accordance with the value of the maximum luminance level. Numeral 10 designates a look-up table operating circuit which normalizes the data of the cumulative histogram memory 9 in accordance with an output of the normalization control register circuit 7. Numeral 11 designates a look-up table memory for storing therein the data normalized by the look-up table operating circuit 10. In general, the luminance level of the input signal enters an address of the memory 11 and the normalized data enters an data thereof. Numeral 12 designates a timing control circuit which makes the sequencing of various operations and the control for the memories. Numeral 13 designates a D/A converter by which output data corrected by use of the look-up table is converted into an analog value.

Next, explanation will be made of the operation of the gradation corrector having the above construction. FIGS. 5A to 5F show operating waveforms of various parts.

First, an input luminance signal a is inputted to the A/D converter 1 and is converted thereby into a digital value which is in turn outputted as a converted input luminance signal b. The converted input luminance signal b is taken as a memory address of the histogram memory 2 and data at that address is processed by the limiter/adder circuit 5. By performing this operation during one vertical scanning interval, it is possible to obtain a histogram distribution of the input luminance signal a. The histogram distribution is shown in FIG. 5A.

Next, data of the histogram memory 2 including the histogram distribution is read by the histogram operating circuit 3 which in turn calculates the mean value, the mode value, the minimum value, the maximum value, the deviation coefficient, the white area, the black area, etc. of the input luminance signal. The histogram operating circuit 3 further determines control values inclusive of a limiter level, the value of addition, an accumulation calculation start luminance level, an accumulation calculation stop luminance level, the maximum luminance level after normalization and so on from the result of the above calculation and transfers the determined data to the limiter/adder circuit 5, the accumulation control register circuit 6 and the normalization control register circuit 7.

Thereafter, the limiter/adder circuit 5 reads data from the histogram memory 2 to make a limiter (see FIG. 5B) and the operation of addition or the like for each read data on the basis of each data transferred from the histogram operating circuit 3 and outputs the result (or corrected histogram data c) to the histogram accumulation circuit 8 (see FIG. 5C). In the case where the value of addition is fixed, a curve obtained by the cumulative addition becomes nearer to a linear profile as the value of addition is larger and approaches to a histogram flatting process as the value of addition is smaller (see FIGS. 5C and 5D).

On the basis of the accumulation start luminance level and the accumulation stop luminance level supplied from the accumulation control register circuit 6, the histogram accumulation circuit 8 calculates cumulative histogram data f from the corrected histogram data c in a range between the accumulation start and stop luminance levels and causes the cumulative histogram memory 9 to store the result of calculation.

Next, the look-up table operating circuit 10 reads the cumulative histogram data from the cumulative histogram memory 9 to determine a normalization coefficient so that the maximum value of the cumulative histogram data becomes the maximum output luminance level h supplied from the normalization control register circuit 7. The look-up table operating circuit 10 performs an operation on all the cumulative histogram data g by use of the determined normalization coefficient and causes the look-up table memory 11 to store the result i. If the maximum output luminance level is controlled, an operation such as an automatic contrast control (ACL) or an automatic brightness control (ABL) is possible. Such an operation is shown in FIG. 5E.

Thereafter, data in the look-up table memory 11 is read with the converted input luminance signal b being used as an address and the read data is outputted as a corrected output luminance signal j. FIG. 5F shows a histogram of the corrected output luminance signal j. The D/A converter 13 outputs the corrected output luminance signal j after conversion thereof into an analog signal k.

The timing control circuit 12 controls the operations of various circuits so that the operations of respective parts are performed at such timings as mentioned above. [For example, refer to Japanese Patent Application No. (Hei)1-265393 (JP-A-3-126,377), entitled "Gradation Corrector", filed by the applicant of the present application.] The gradation corrector proposed in the preceding application JP-A-3-126,377 is of a same type as the above corrector shown in FIG. 4 and adapted to be capable of sufficiently effecting gradation correction on signals of bright levels and intermediate luminance levels as well as on those of black side, and yet capable of effecting gradation correction of higher fidelity and higher contrast, while capable of preventing overextension of dynamic range. These gradation corrections are effected, as above noted, by adding or subtracting preselected values to or from the data of histogram, substituting preselected values for that of higher or lower than a certain value, thereby optimizing effects of histogram flatting processing, and by controlling range of histogram data to be accumulated or controlling the maximum of the normalized data. In an embodiment of the preceding application, the histogram operating circuit comprises an average luminance level computing circuit for computing from data of the histogram memory an average value of input luminance signal, a mode luminance level detection circuit for detecting a mode value, maximum and minimum detection circuits, a circuit for computing a deviation (dispersion) coefficient from data of the histogram memory, and a computing circuit for computing white and black areas. With these circuits the histogram operating circuit is adapted to further compute the control values such as limiter level, accumulation start/stop luminance level, etc. The average value of input luminance signal is computed from the histogram memory data and along the following equation ().

average value = (input luminance levels) ×     (1)

(histogram values) ÷ (total number of picture elements)

The mode value designates an input luminance signal level causing a maximum of histogram data. The maximum value detected by the detection circuit designates an input luminance level corresponding to an upper limit of the histogram distribution, and the detected minimum value designates an input luminance level corresponding to a lower limit of the histogram distribution. The black area designates picture elements of input signal luminance levels, for example, in a luminance range of 0 to 40% of the histogram distribution while the white area designates picture element of input signal luminance levels, for example, in a luminance range of more than 60% of the histogram distribution. The deviation coefficient may be calculated as a standard deviation or alternatively may be calculated simply along the following equation (2).

(deviation coefficient) = [(maximum value) −     (2)

(minimum value)] × constant ÷ (maximum value of histogram)

The histogram operating circuit 3 of the gradation corrector shown in present FIG. 4 is substantially the same constitution and function as the preceding circuit just mentioned.

In the above type gradation correctors, however, since the minimum value of the histogram to be detected is an instantaneous value detected from the histogram in one vertical scanning interval, there is a problem that if many noises are included in a video signal, the minimum value detected has a great variation with the result that the corrected output luminance signal oscillates, which value may affect to such corrected output luminance signal more significantly than other histogram features.

SUMMARY OF THE INVENTION

Objects of the present invention made to solving the above-mentioned problem in the preceding correctors are to provide a gradation corrector which can make a smooth correction so that the minimum value to be detected is not affected by noises or the like and to provide a gradation corrector which can follow a change in video scene with no delay in response.

According to one aspect of the present invention, there is provided a gradation corrector comprising a histogram memory for storing a histogram of a video luminance signal, a histogram operating circuit connected to the histogram memory for extracting a feature of the histogram from data stored in the histogram memory, a limiter/adder circuit connected to an output of the histogram operating circuit for processing the data of the histogram memory, an accumulation control register circuit and a normalization control register circuit each connected to an output of the histogram operating circuit, a histogram accumulation circuit connected to the histogram memory and the accumulation control register circuit for making a cumulative addition for the processed data of the histogram memory, a cumulative histogram memory for storing the result of cumulative addition, a look-up table operating circuit connected to the cumulative histogram memory and the normalization control register circuit for normalizing data of the cumulative histogram memory, and a look-up table memory for storing the result of normalization, the histogram operating circuit including a circuit for detecting the minimum value of the histogram, the minimum value detecting circuit having a circuit for detecting S/N from an input video signal and a clipping circuit connected to an output of the S/N detecting circuit and an output of the histogram memory, a clipping level of the clipping circuit being controlled by the output of the S/N detecting circuit.

With the above construction, it is possible to prevent a large variation of the minimum value to be detected, which variation may be caused from noises included in the video signal. As a result, it is possible to realize an excellent gradation corrector in which a corrected output signal does not oscillate.

According to another aspect of the present invention, the histogram operating circuit includes a circuit for detecting a change in video scene, a recursive filter circuit, and a circuit for controlling a feedback coefficient of the recursive filter circuit in accordance with an output of the video scene change detecting circuit. Thereby, a variation of a value to be detected, which may be caused from noises or the like, can be suppressed greatly in accordance with the degree of change in scene. As a result, it is possible to an excellent gradation corrector which can make a smooth correction.

According to a further aspect of the present invention, the histogram operating circuit includes a circuit for detecting a change in video scene, a recursive filter circuit, and a selector circuit for outputting either an input signal of the recursive filter circuit or an output signal of the cyclic filter circuit in accordance with an output of the video scene change detecting circuit. Thereby, when the video scene has a sudden change, a delay in response owing to the recursive filter circuit can be avoided. As a result, it is possible to realize an excellent gradation corrector which can make a gradation correction following a change in video scene.

With the above-mentioned various constructions of the present invention, the following effects are provided. It is possible to prevent a variation of a detected value due to noises by detecting the S/N ratio of the input video signal and changing the clipping level of the clipping circuit for detection of the minimum value in accordance with the level or magnitude of the S/N ratio. Also, it is possible to make a smooth correction with the suppressed variation of the minimum value to be detected by additionally providing the recursive filter circuit and changing the feedback coefficient of the recursive filter circuit in accordance with the degree of a change in video scene. Further, in the case where the video scene has a sudden change, it is possible to avoid a delay in response by outputting an instantaneous value without being passed through the recursive filter circuit.

DESCRIPTION OF THE PREFERRED EMBODIMENTS

Figure 1:
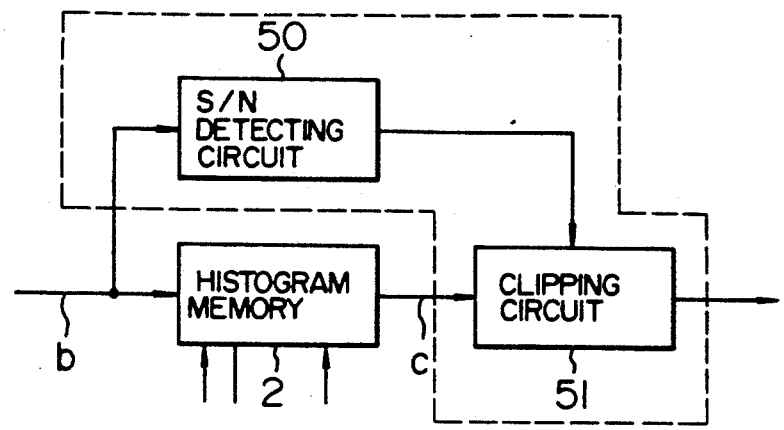
FIG. 1 shows a block diagram of an essential portion of one embodiment of the present invention.
Figure 2:
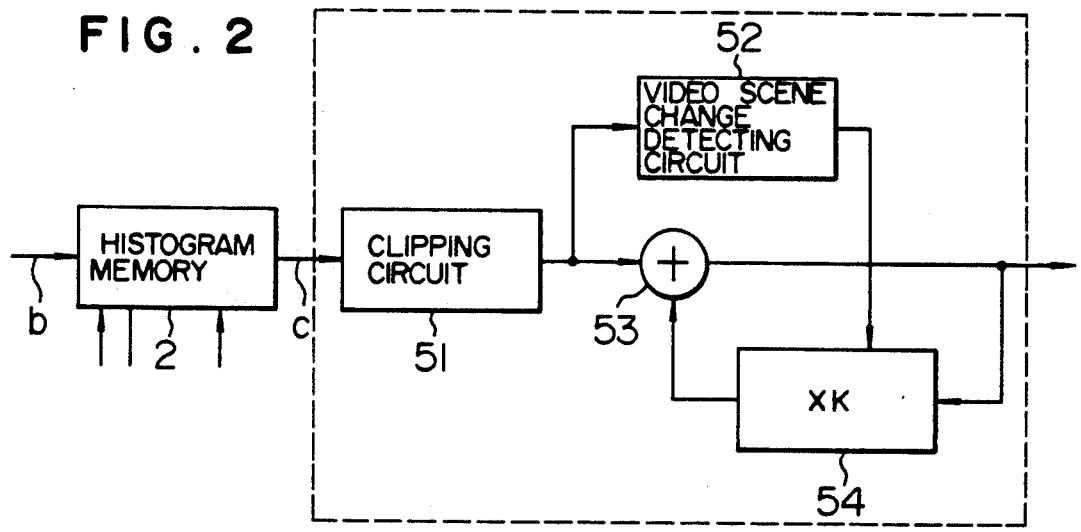
FIG. 2 shows a block diagram of an essential portion of another embodiment of the present invention.
Figure 3:
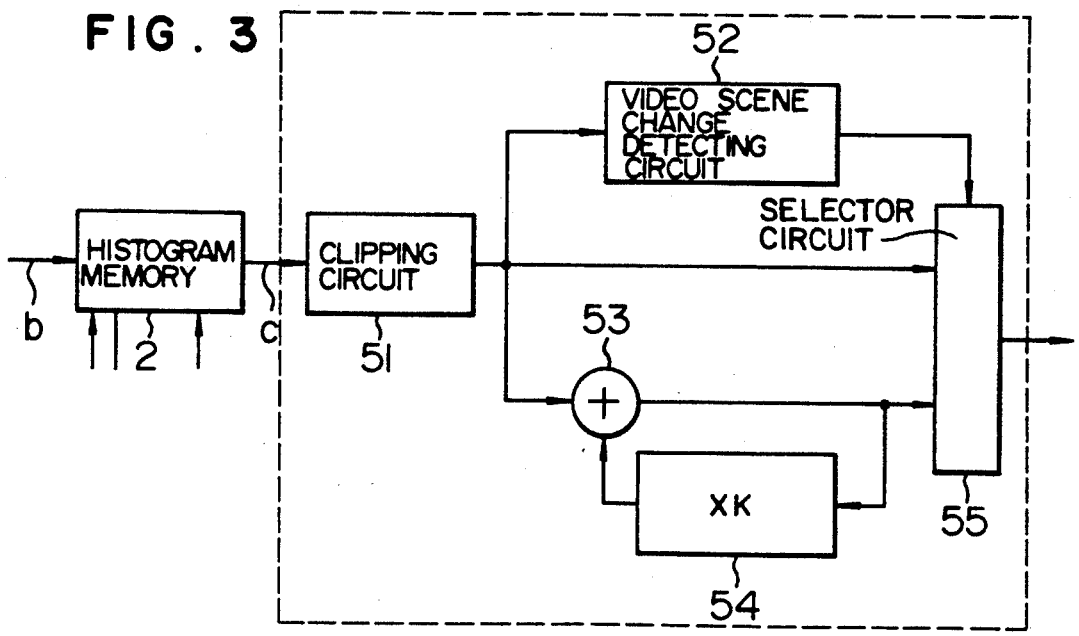
FIG. 3 shows a block diagram of an essential portion of still another embodiment of the present invention.
Figure 4:
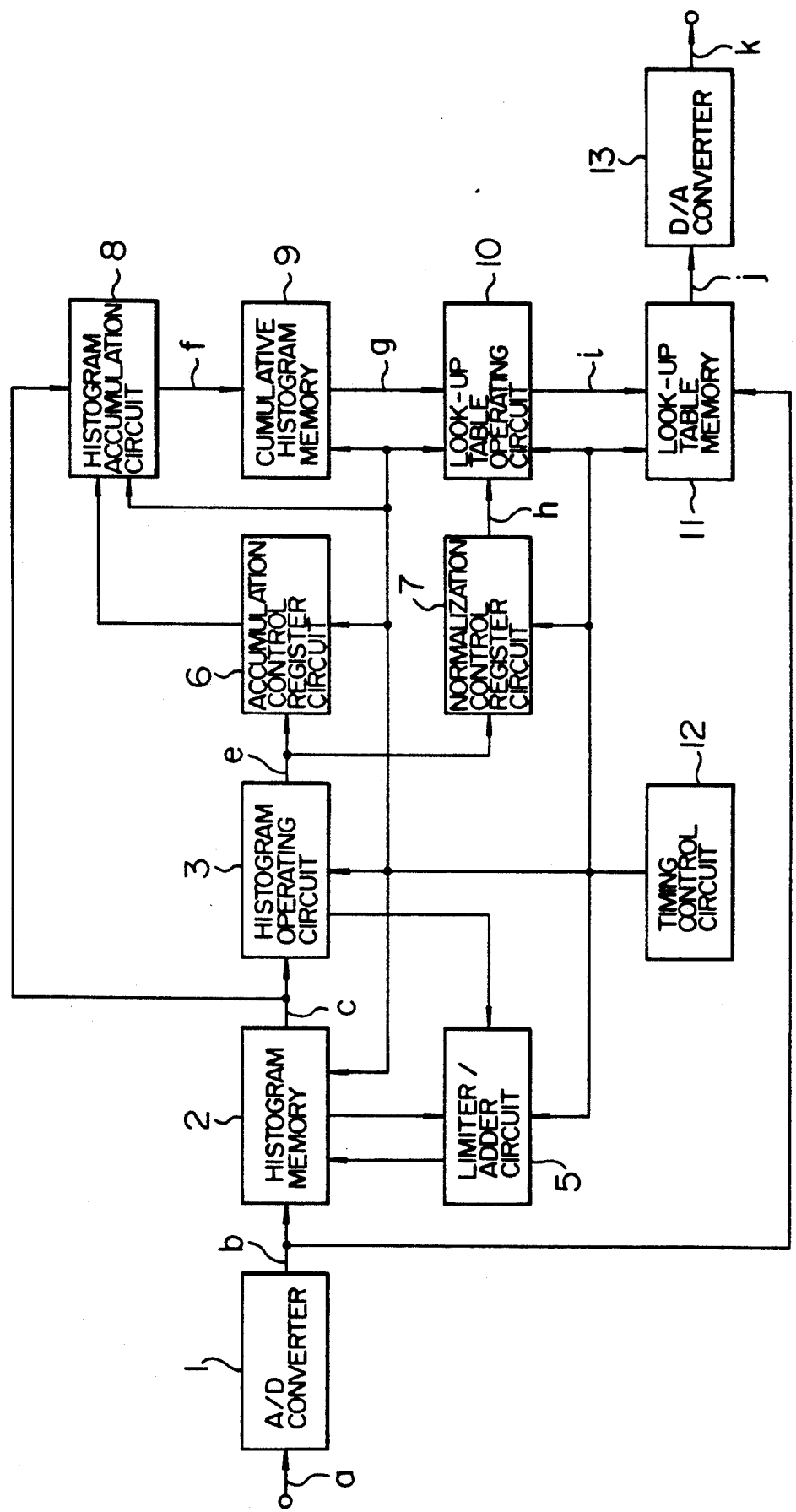
FIG. 4 shows a block diagram of a gradation corrector.
Figure 5A:
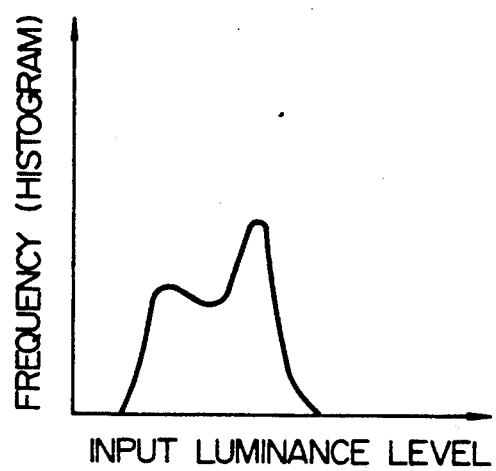
FIGS. 5A to 5F show waveforms for explaining the operation of the gradation corrector shown in FIG. 4.
Figure 5B:
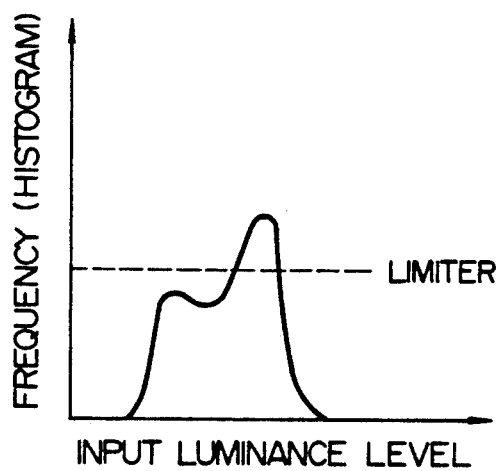
Figure 5C:
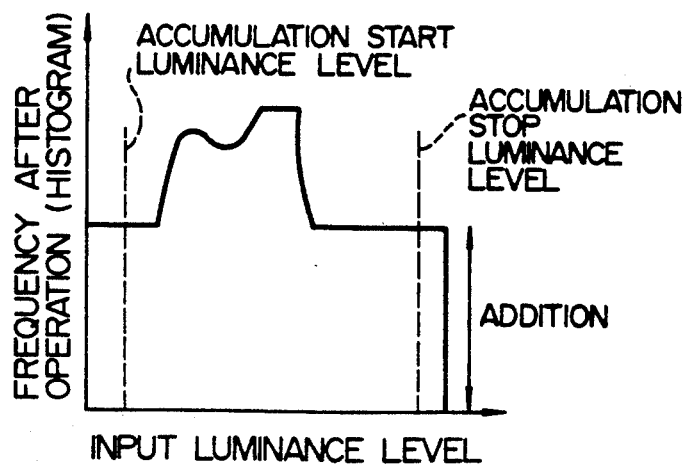
Figure 5D:
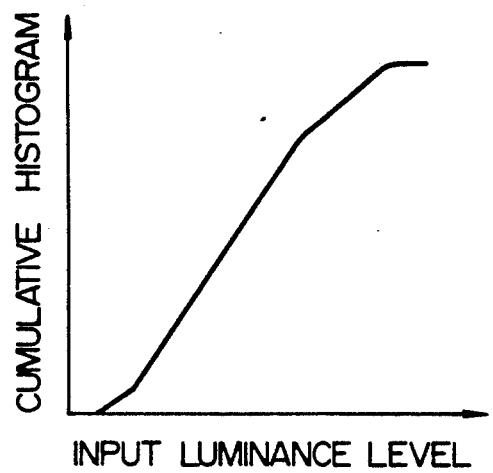
Figure 5E:
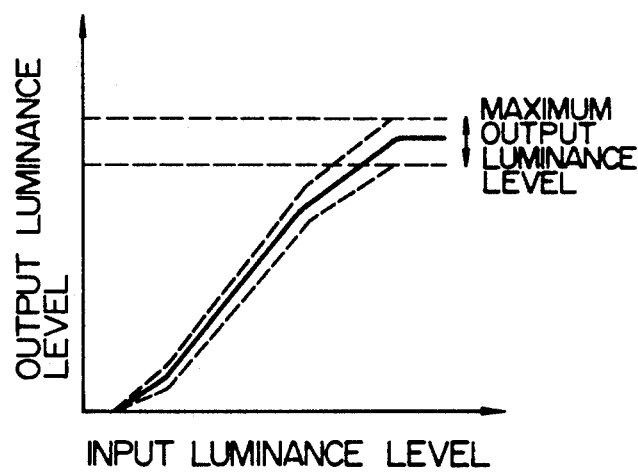
Figure 5F:
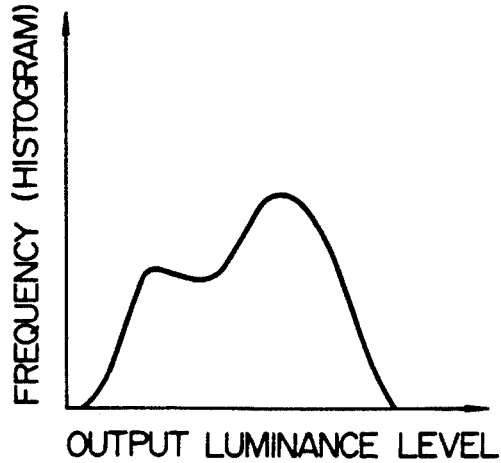

The output signal e of the histogram operating circuit 3 shown in FIG. 4 representatively indicates signals of the control values such as limiter level, addition value, accumulation start/stop luminance levels. These control values are also calculated by the operating circuit 3 in dependence upon histogram features such as mean value, mode value, minimum value, etc. computed or detected in the circuit 3. FIGS. 1 to 3 show in dashed blocks circuits for the detection of the minimum value of the histogram, which circuits are included in the respective histogram operating and circuits 3. The respective minimum value detection circuit results in controlling the output signal e of the circuit 3.

Embodiment 1

FIG. 1 shows a main part of one embodiment of the present invention. In the figure, reference numeral 2 designates a histogram memory which is the same as that used in the conventional gradation corrector. Numeral 50 designates an S/N detecting circuit which detects the level of noise included in a video signal. Numeral 51 designates a clipping circuit which clips a frequency which is not higher than a certain level to have a clipped level zero.

Explanation will now be made of the operation of the above construction. First, the level of noises in a video signal is detected by the S/N detecting circuit 50. Then, a clipping level of the clipping circuit 51 is changed in accordance with an output level of the S/N detecting circuit 51. More particularly, the clipping level is made large in the case where many noises are involved and small in the case where less noises are involved.

According to the present embodiment as described above, a large variation of the minimum value to be detected, which variation may be caused from noises included in the video signal, can be prevented by providing the S/N detecting circuit 50 and the clipping circuit 51 which is connected to the S/N detecting circuit 50 and the clipping level of which is controlled by an output of the S/N detecting circuit 50. As a result, it is possible to make a gradation correction with no oscillation of a corrected output signal.

Embodiment 2

FIG. 2 shows another embodiment of the present invention. In the figure, reference numerals 2 and 51 designate a histogram memory and a clipping circuit which are the same as those shown in FIG. 1. Numeral 52 designates a video scene change detecting circuit which detects the degree of change in video scene. Numeral 53 designates an adder and numeral 54 designates a xK circuit which multiplies feedback data by the weight K. The adder 53 and the xK circuit 54 form a recursive filter circuit.

Explanation will now be made of the operation of the above construction. First, a frequency not higher than a certain level is clipped to zero by the clipping circuit 51 and an output signal of the clipping circuit 51 is connected to the recursive filter circuit. Then, the weight K of a feedback coefficient of the recursive filter circuit is controlled by an output of the video scene change detecting circuit 52 or in accordance of the degree of change in video scene to the optimum value in a range where the minimum value to be detected does not oscillate. More especially, when the change in video scene is small, the value of K is made large.

According to the present embodiment as described above, a variation of a value to be detected, which may be caused from noises or the like, can be suppressed greatly by providing the video scene change detecting circuit 52, the adder 53 and the xK circuit 54 the feedback coefficient of which is controlled by an output of the video scene change detecting circuit 52. As a result, it is possible to make a smooth gradation correction.

Embodiment 3

FIG. 3 shows still another embodiment of the present invention. In the figure, reference numerals 2, 51, 52, 53 and 54 designate a histogram memory, a clipping circuit, a video scene change detecting circuit, an adder and a xK circuit which are the same as those shown in FIG. 2. Numeral 55 designates a two-input/one-output selector circuit which makes a change-over between an output of the clipping circuit 51 and an output of the recursive filter circuit in accordance with an output of the video scene change detecting circuit 52.

The operation of the above construction will now be explained. First, a frequency not higher than a certain level is clipped to zero by the clipping circuit 51 and an output of the clipping circuit 51 is connected to the recursive filter circuit. Then, the selector circuit 55 selects an output of the recursive filter circuit usually and the output of the clipping circuit 51 when a video scene has a sudden change.

According to the present embodiment as described above, a delay in response, which may be caused owing to the recursive filter circuit when the video scene has a sudden change, can be avoided by providing the video scene change detecting circuit 52, the adder 53, the xK circuit 54 and the selector circuit 55 which is controlled by an output of the video scene detecting circuit 52. As a result, it is possible to make a smooth gradation correction which follows a change in video scene.

We claim:

1. A gradation corrector comprising a histogram memory for storing a histogram of a video luminance signal, a histogram operating circuit connected to the histogram memory for extracting a feature of the histogram from data stored in the histogram memory, a limiter/adder circuit connected to an output of the histogram operating circuit for processing the data of the histogram memory, an accumulation control register circuit and a normalization control register circuit each connected to an output of the histogram operating circuit, a histogram accumulation circuit connected to the histogram memory and the accumulation control register circuit for making a cumulative addition for the processed data of the histogram memory, a cumulative histogram memory for storing the result of cumulative addition, a look-up table operating circuit connected to the cumulative histogram memory and the normalization control register circuit for normalizing data of the cumulative histogram memory, and a look-up table memory for storing the result of normalization, the histogram operating circuit including a circuit for detecting the minimum value of the histogram; the minimum value detecting circuit having a circuit for detecting S/N from an input video signal and a clipping circuit connected to an output of the S/N detecting circuit and an output of the histogram memory, a clipping level of the clipping circuit being controlled by the output of the S/N detecting circuit.

2. A gradation corrector comprising a histogram memory for storing a histogram of a video luminance signal, a histogram operating circuit connected to the histogram memory for extracting a feature of the histogram from data stored in the histogram memory, a limiter/adder circuit connected to an output of the histogram operating circuit for processing the data of the histogram memory, an accumulation control register circuit and a normalization control register circuit each connected to an output of the histogram operating circuit, a histogram accumulation circuit connected to the histogram memory and the accumulation control register circuit for making a cumulative addition for the processed data of the histogram memory, a cumulative histogram memory for storing the result of cumulative addition, a look-up table operating circuit connected to the cumulative histogram memory and the normalization control register circuit for normalizing data of the cumulative histogram memory, and look-up table memory for storing the result of normalization, the histogram operating circuit including a circuit for detecting the minimum value of the histogram, the minimum value detecting circuit including a clipping circuit connected to an output of the histogram memory for extracting said feature of the histogram, a change detection circuit connected to an output of the clipping circuit for detecting a change in a video scene of an input video signal, a recursive filter circuit composed of an adder connected to the output of the clipping circuit and a controllable multiplication circuit connected to receive an output of the adder and having a multiplication coefficient K changeable in dependence upon the detected change in the video scene, said multiplication circuit being adapted to multiply said output of the adder by the multiplication coefficient K changed dependently upon the change in the video scene detected by the change detecting circuit.

3. A gradation corrector comprising a histogram memory for storing a histogram of a video luminance signal, a histogram operating circuit connected to the histogram memory for extracting a feature of the histogram from data stored in the histogram memory, a limiter/adder circuit connected to an output of the histogram operating circuit for processing the data of the histogram memory, an accumulation control register circuit and a normalization control register circuit each connected to an output of the histogram operating circuit, a histogram accumulation circuit connected to the histogram memory and the accumulation control register circuit for making a cumulative addition for the processed data of the histogram memory, a cumulative memory for storing the result of cumulative addition, a look-up table operating circuit connected to the cumulative histogram memory and the normalization control register circuit for normalizing data of the cumulative histogram memory, and a look-up table memory for storing the result of normalization, the histogram operating circuit including a circuit for detecting the minimum value of the histogram, the minimum value detecting circuit including a clipping circuit connected to an output of the histogram memory for extracting said feature of the histogram, a change detection circuit connected to an output of the clipping circuit for detecting a change in a video scene of an input video signal, a recursive filter circuit composed of an adder connected to the output of the clipping circuit and a multiplication circuit connected to receive an output signal of the adder for multiplying said adder output signal by a certain coefficient K, and a two-input/one-output selector circuit for making a change-over between an output of the adder of the recursive filter circuit and the output of the clipping circuit in accordance with the change in the video scene detected by the change detecting circuit.

* * * * *